March 24, 1925.

J. O. PHELPS 1,531,216

SAFETY RAIL JOINT FASTENER

Filed Aug. 20, 1924    2 Sheets-Sheet 1

Inventor:
John O. Phelps,
by Hazard and Miller
Attorneys.

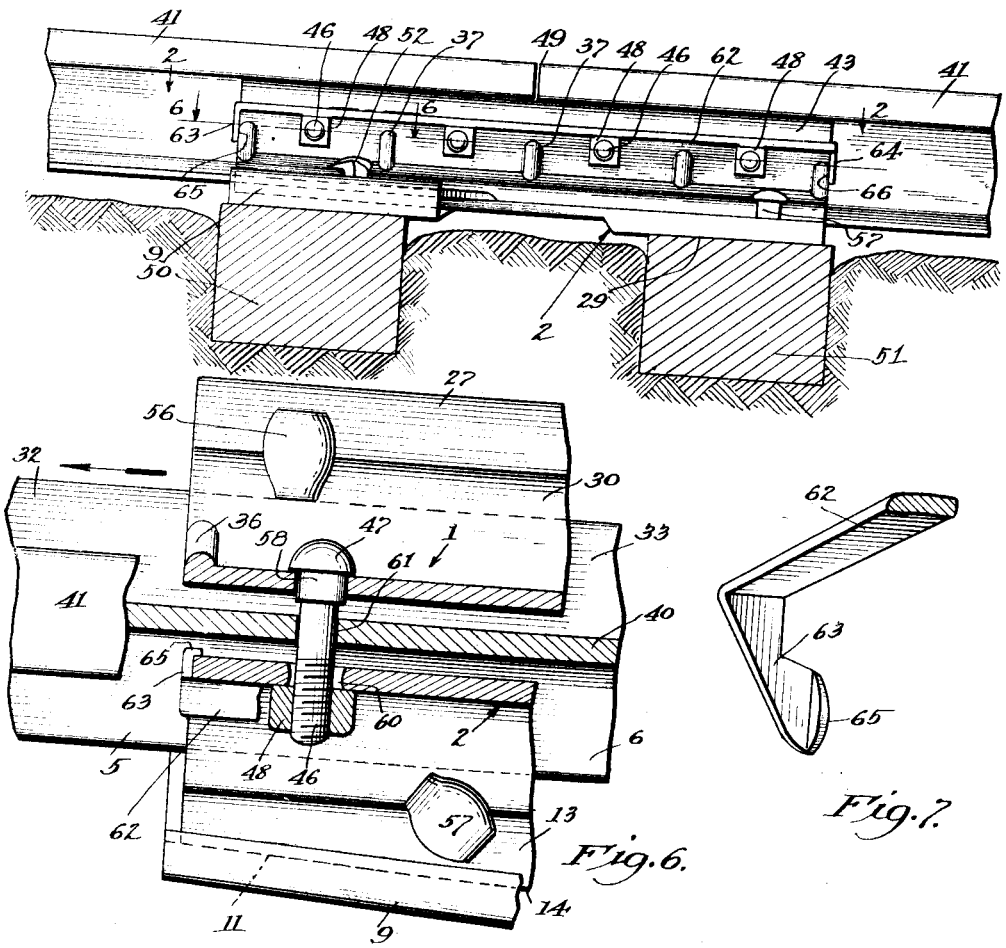
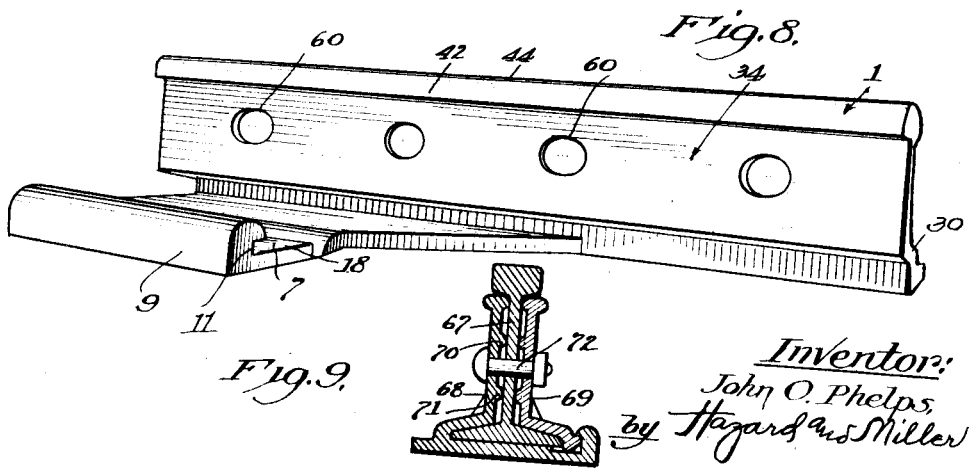

Patented Mar. 24, 1925.

1,531,216

UNITED STATES PATENT OFFICE.

JOHN O. PHELPS, OF LOS ANGELES, CALIFORNIA.

SAFETY RAIL-JOINT FASTENER.

Application filed August 20, 1924. Serial No. 733,176.

*To all whom it may concern:*

Be it known that I, JOHN O. PHELPS, a citizen of the United States, residing at Los Angeles, in the county of Los Angeles and State of California, have invented new and useful Improvements in Safety Rail-Joint Fasteners, of which the following is a specification.

This invention relates to safety rail-joint fasteners.

An object is to provide a fastener consisting of two identical pieces, each of which is adapted to be used in either right hand or left hand position as arranged in a set for clamping the ends of two rails together.

Another object is to provide a rail-joint fastener which not only provides means for clamping the contiguous ends of rails, but forms a rigid chair to eliminate loose and low joints.

Another object is to provide a rail-joint fastener which will allow for the natural expansion and contraction of the rails.

Another object is to provide a rail-joint fastener in two identical pieces which may be readily cast or forged and assembled without joints or other pieces.

Another object is to provide a rail-joint fastener consisting of a pair of identical clamp members mutually co-operating wedge-fashion in the clamping of rail ends.

Another object is to provide a rail-joint fastener which may be securely connected to the rails and to the ties to prevent creeping.

Another object is to provide a rail-joint fastener having a single locking member for all of the nuts.

Another object is to provide a rail-joint fastener to engage the rails and lock the rails together by friction.

Other objects and advantages will appear from the drawings and specification.

The drawings illustrate the construction and operation of a rail-joint fastener embodying the principles of my invention.

Fig. 5 is a side elevation looking in the direction indicated by the arrow 5 in Fig. 2.

Fig. 6 is a fragmentary horizontal longitudinal section on the line 6—6 of Fig. 5.

Fig. 7 is a fragmentary perspective of one end of the nut lock member shown in Fig. 5.

Fig. 8 is a perspective of one of the rail-joint fastener pieces shown in Fig. 1.

Fig. 9 is a cross section showing a modified construction of the rail-joint fasteners as made and applied to a high rail such as a street car rail.

Figure 1:
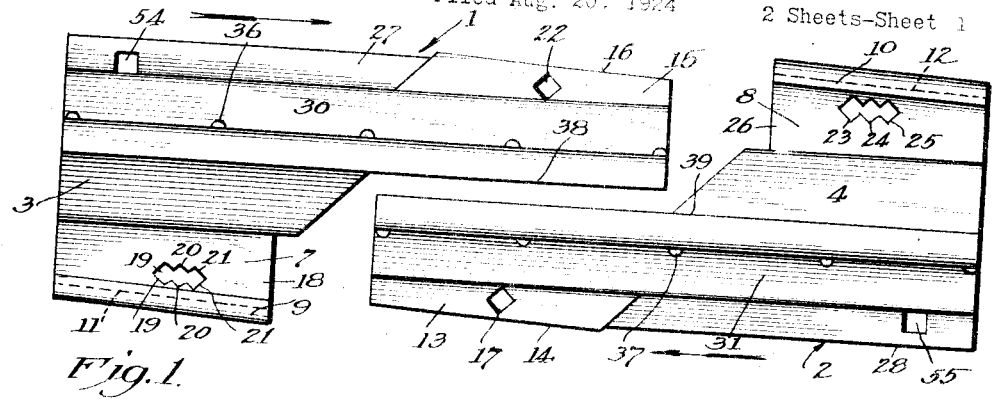
Figure 1 is a top plan view of the two identical rail-joint fastener pieces in position as when ready to go together.

The details of construction and operation shown in the drawings are as follows:

The rail-joint fastener includes a pair of identical chair and clamping members 1 and 2. The members 1 and 2 each have a central body 3 and 4 having a plain top face on which the bases 5 and 6 of the rails rest. At the outer sides of the central bodies 3 and 4 are recesses 7 and 8 and at the outer sides of the recesses are lateral undergrooved jaws 9 and 10. The outer sides 11 and 12 of the recesses 7 and 8 are slightly inclined when seen in plan as in Fig. 1 and the jaws 9 and 10 are correspondingly inclined relative to the straight line the rails will occupy and the inner ends of the jaws are farther from this line than the outer ends, as required to make wedge-shaped sockets. The member 2 has a wedge-shaped portion 13 to fit in the recess 7 and has an inclined outer edge 14 to engage under the jaw 9, and the member 1 has a wedge-shaped portion 15 with an inclined outer edge 16 to fit in the recess 8 under the jaw 10.

A square spike hole 17 is formed through the portion 13, the sides of the hole being diagonal to the line of the rail and an adjustable spike hole is formed through the plate 18 forming the bottom of the recess 7, this spike hole having portions 19, 20 and 21, any one of which will closely fit a spike driven through the spike hole 17 so as to make means for adjustment when the portion 13 is driven into the recess 7, whereas if only a single spike hole were formed through the plate 8 there would be no adjustment. The spike passing through the hole 17 would be required to pass through the hole in the plate 18 whether it made a tight fit or not.

In a like manner, a square spike hole 22 is formed through the portion 15 diagonal to the line of the rail and a spike hole having the portions 23 and 24 and 25 is formed in the plate 26 forming the bottom of the recess 8. The portion 27 of the member 1 extends from the portion 16 to the opposite end of the member and is offset downwardly to a level of the lower face of the central body 3, and in a like manner the portion 28 of the member 2 extends from the portion 13 to the opposite end of the member and is offset downwardly to form the lower face 29 on a level with the lower face of the body 4. The cover portions 30 and 31 extend inwardly and upwardly from the opposite sides of the bodies 3 and 4 from the recesses 7 and 8 and from the portions 13 and 16 to engage the upper faces 32 and 33 of the bases 5 and 6, as shown in Fig. 3.

Clamping members 34 and 35 extend upwardly from the inner edges of the portions 30 and 31 and have reinforcing ribs 36 and 37 extending from their outer faces outwardly and downwardly to the portions 30 and 31. Ribs 38 and 39 extend inwardly along the upper edges of the clamping members 34 and 35 to engage the webs 40 of the rails 5 and 6 just under the treads 41 and space the clamping members 34 and 35 from the webs 40. Bulbs 42 and 43 extend outwardly from the upper edges of the clamping members 34 and 35 in the horizontal plane of the ribs 38 and 39, the outer faces 44 and 45 being rounded from the top downwardly and outwardly and extending beyond the side faces of the treads 41. Clamping bolts 46 are inserted through the clamping members 34 and 35 and through the webs 40, the heads 47 of the bolts being under the bulb 42 and the nuts 48 of the bolts being under the bulb 43, so that if a car wheel runs off the tread 41 and falls downwardly at either side of the rail the bulbs 42 and 43 will protect the heads 47 and the nuts 48, so as not to break the bolts 46.

Figure 2:
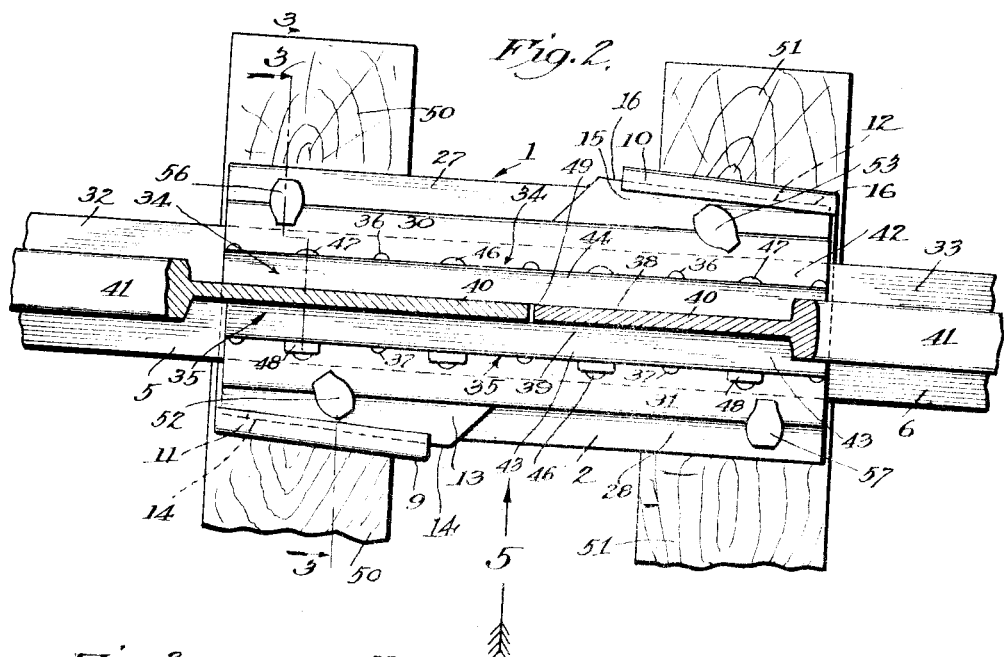
Fig. 2 is a fragmentary sectional detail of an assembled rail-joint including my rail-joint fasteners shown in Fig. 1, the webs of the rails being broken away to show the construction, and the view being taken on the lines 2—2 of Figs. 3 and 5 and looking downwardly as indicated by the arrows.
Figures 3, 4:
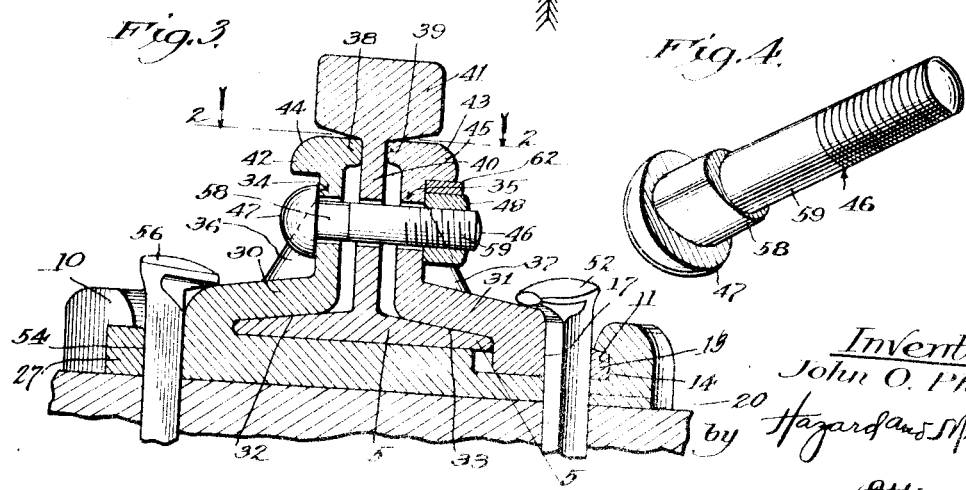
Fig. 3 is a cross section on the line 3—3 of Fig. 2 and looking in the direction indicated by the arrows.
Fig. 4 is a perspective of one of the bolts for connecting the fasteners together through the rail as shown in Fig. 3.

Referring to Figs. 1, 2 and 3, the members 1 and 2 may be placed as shown ready to go together, and the rail bases 5 and 6 placed upon the central bodies 3 and 4 with the meeting point 49 of the rails substantially half way between two ties 50 and 51. Then the members 1 and 2 are driven firmly toward each other with the portion 17 passing into the recess 8 and the portion 13 passing into the recess 7 and the ribs 38 and 39 passing under the heads 41 until the rail ends are firmly gripped. Then the spike 52 and 53 may be driven through the spike holes 17 and 22 into any one of the portions 19, 20 and 21 of the spike hole in the plate 18 and the portions 23, 24 and 25 of the spike hole in the plate 26, the spikes 52 and 53 being diagonal to the line of the rail. A spike hole 54 is formed in the member 1 at the opposite side from the recess 7 and a similar spike hole 55 is formed in the member 2 at the opposite side from the recess 8 and ordinary spikes 56 and 57 are driven into these holes 54 and 55.

The bolts 46 have heads 47 and oval necks 58 larger than the bodies 59. The bolt holes 60 through the clamping members 34 and 35 are longitudinally elongated as shown in Fig. 8, it being understood that the holes 60 in both members are alike. When it comes to applying these bolts, as in Fig. 6, the necks 58 of the bolts fits closely in the holes 60 of the member 1 and fit closely in the bolt holes 61 in webs 40 and the round portion or body 59 of each bolt fits loosely in the opening 60 in the member 2, thereby providing for expansion and contraction of the rails to the extent of the looseness of the parts and to the extent allowed for movement of the bolt bodies 59 longitudinally of the rails in the holes 60.

In assembling a rail-joint fastener as shown and described, the nuts 48 will be all upon one side as shown in Fig. 5, and should all be tightened to squared positions, so that the nut locking bar 62 will fit between the nuts 48 and the corresponding bulb 43 to hold the nuts from turning. The bar 62 is held in place by arms 63 and 64 extending at right angles to the body of the bar and having teeth 65 and 66 to snap past the ends of the clamping member 35, as shown in Figs. 5 and 6.

Referring to Fig. 9, the web 67 of the rail is extra high and the clamping members have ribs 70 and 71 extending from their inner faces at opposite sides of the bolts 72, so that when the bolts 72 are tightened the ribs 70 and 71 will grip the web 67 and will hold the clamping members 68 and 69 from collapsing under the tension or pull of the bolts.

Various changes may be made without departing from the spirit of the invention as claimed.

I claim:

1. A safety rail-joint fastener comprising a pair of substantially identical gripping members having mutually wedging action to clamp upon rail ends, each member including a transverse end body portion having at one side a wedge shaped portion and at the other side an under grooved jaw and each jaw having an overhanging arm for wedging co-operation with the wedge shaped portion of the companion member in a fastener, there being a square spike hole in the upper one of the wedging members, the sides of the hole being diagonal to the line of the rail, and there being an adjustable hole in the lower one of the wedging members, said holes being adapted to receive a spike driven downwardly through the assembled wedging members into a tie.

2. In a safety rail-joint fastener, a pair of substantially identical gripping members having mutually wedging action to clamp upon rail ends, the upper one of the wedging members having a square spike hole, the sides of the hole being diagonal to the line of the rail, and there being an adjustable hole in the lower one of the wedging members, the sides of the hole being diagonal to the line of the rail and the relative sides being superposed to provide an adjustment less than the diagonal transverse section of a spike, said holes being adapted to receive a spike driven downwardly through the assembled wedging members into a tie.

3. A safety rail-joint fastener comprising a pair of substantially identical gripping members having mutually wedging action to clamp upon rail ends, each member including a transverse end body portion having at one side a wedge shaped portion and at the other side an under grooved jaw and each jaw having an overhanging arm for wedging co-operation with with the wedge shaped portion of the companion member in a fastener, there being spike holes for attaching the gripping members to ties and there being horizontal bolt holes for the insertion of bolts through the horizontal holes and through the rails to be gripped, so as to connect the rails to the ties through the gripping members as required to prevent creeping.

4. In a rail-joint fastener, gripping members adapted to engage the webs of the meeting ends of rails, bolts inserted through the gripping members and through the rails with the nuts all on one side and adjusted to square up and down and horizontal positions, a nut locking bar adapted to be fitted tightly between the tops of the nuts, and an overhanging bulb upon each gripping member.

5. In a rail-joint fastener, gripping members adapted to engage the webs of the meeting ends of rails, bolts inserted through the gripping members and through the rails with the nuts all on one side and adjusted to square up and down and horizontal positions, a nut locking bar adapted to be fitted tightly between the tops of the nuts, an overhanging bulb upon each gripping member, and arms extending from the end of the bar and having teeth adapted to snap around the end of the gripping member.

6. A safety rail-joint fastener comprising a pair of substantially identical gripping members having mutually wedging action to clamp upon rail ends, each member including a transverse end body portion having at one side a wedge shaped portion and at the other side an undergrooved jaw part and each jaw part having an overhanging arm for wedging co-operation with the wedge shaped portion of the companion member in a fastener, there being spike holes for attaching the gripping members to ties and there being horizontal bolt holes for the insertion of bolts through the horizontal holes and through the rails to be gripped, so as to connect the rails to the ties through the gripping members as required to prevent creeping, and there being longitudinally extending ribs upon the inner faces of the gripping members to support the gripping members when bolts are inserted through the gripping members and the rail webs.

In testimony whereof I have signed my name to this specification.

JOHN O. PHELPS.